US008694385B1

(12) United States Patent
Bowman et al.

(10) Patent No.: US 8,694,385 B1
(45) Date of Patent: Apr. 8, 2014

(54) IDENTIFYING ITEMS RELEVANT TO A CURRENT QUERY BASED ON ITEMS ACCESSED IN CONNECTION WITH SIMILAR QUERIES

(75) Inventors: Dwayne Bowman, Palo Alto, CA (US); Greg Linden, Palo Alto, CA (US); Ruben E. Ortega, Palo Alto, CA (US); Joel R. Spiegel, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 241 days.

(21) Appl. No.: 13/175,754

(22) Filed: Jul. 1, 2011

Related U.S. Application Data

(63) Continuation of application No. 12/619,578, filed on Nov. 16, 2009, now Pat. No. 7,974,885, which is a continuation of application No. 11/118,118, filed on Apr. 29, 2005, now Pat. No. 7,620,572, which is a continuation of application No. 09/344,802, filed on Jun. 25, 1999, now Pat. No. 7,050,992, which is a continuation-in-part of application No. 09/041,081, filed on Mar. 10, 1998, now Pat. No. 6,185,558, which is a continuation-in-part of application No. 09/033,824, filed on Mar. 3, 1998, now abandoned.

(51) Int. Cl.
*G06Q 30/00* (2012.01)

(52) U.S. Cl.
USPC .......................................... 705/26.1; 705/27.1

(58) Field of Classification Search
USPC ............................................... 705/26.1, 27.1
See application file for complete search history.

(56) References Cited

U.S. PATENT DOCUMENTS

| 4,996,642 A | 2/1991 | Hey |
| 5,446,891 A | 8/1995 | Kaplan et al. |
| 5,583,763 A | 12/1996 | Atcheson et al. |
| 5,640,553 A | 6/1997 | Schultz |
| 5,659,742 A | 8/1997 | Beattie et al. |

(Continued)

FOREIGN PATENT DOCUMENTS

| EP | 0751471 A1 | 1/1997 |
| JP | 04-221489 A | 8/1992 |

(Continued)

OTHER PUBLICATIONS

"AcuBid.com Announces the Release of Its Nev Auction Alert Program", Business Editors/ High-Tech Writers, Business Wire. New York. Downloaded from Proquest Direct on the Internet on Sep. 1, 2008., Jun. 10, 1999, pp. 1.

(Continued)

*Primary Examiner* — James Zurita
(74) *Attorney, Agent, or Firm* — Novak Druce Connolly Bove + Quigg LLP

(57) ABSTRACT

The present invention provides a software facility for identifying the items most relevant to a current query based on items selected in connection with similar queries. In preferred embodiments of the invention, the facility receives a query specifying one or more query terms. In response, the facility generates a query result identifying a plurality of items that satisfy the query. The facility then produces a ranking value for at least a portion of the items identified in the query result by combining the relative frequencies with which users selected that item from the query results generated from queries specifying each of the terms specified by the query. The facility identifies as most relevant those items having the highest ranking values.

20 Claims, 10 Drawing Sheets

(56) References Cited

U.S. PATENT DOCUMENTS

| | | | |
|---|---|---|---|
| 5,675,788 | A | 10/1997 | Husick et al. |
| 5,717,914 | A | 2/1998 | Husick et al. |
| 5,742,816 | A | 4/1998 | Barr et al. |
| 5,748,954 | A | 5/1998 | Mauldin |
| 5,754,237 | A | 5/1998 | Jung |
| 5,754,938 | A | 5/1998 | Herz et al. |
| 5,822,731 | A | 10/1998 | Schultz |
| 5,826,261 | A | 10/1998 | Spencer |
| 5,873,076 | A | 2/1999 | Barr et al. |
| 5,875,443 | A | 2/1999 | Nielsen |
| 5,877,485 | A | 3/1999 | Swartz |
| 5,920,859 | A | 7/1999 | Li |
| 6,006,222 | A * | 12/1999 | Culliss .................................. 1/1 |
| 6,006,225 | A | 12/1999 | Bowman et al. |
| 6,014,654 | A | 1/2000 | Ariyoshi |
| 6,014,665 | A | 1/2000 | Culliss |
| 6,026,377 | A | 2/2000 | Burke |
| 6,085,176 | A | 7/2000 | Woolston |
| 6,185,558 | B1 | 2/2001 | Bowman et al. |
| 6,202,058 | B1 | 3/2001 | Rose et al. |
| 6,421,653 | B1 | 7/2002 | May |
| 6,421,675 | B1 | 7/2002 | Ryan et al. |
| 6,460,036 | B1 | 10/2002 | Herz |
| 6,493,702 | B1 | 12/2002 | Adar et al. |
| 6,631,372 | B1 | 10/2003 | Graham |
| 6,954,755 | B2 | 10/2005 | Reisman |
| 7,050,992 | B1 | 5/2006 | Bowman et al. |
| 7,062,488 | B1 | 6/2006 | Reisman |
| 7,124,129 | B2 | 10/2006 | Bowman et al. |
| 7,305,390 | B2 | 12/2007 | Bowman et al. |
| 2001/0042064 | A1 | 11/2001 | Davis et al. |
| 2002/0123988 | A1 | 9/2002 | Dean et al. |
| 2006/0106757 | A1 | 5/2006 | Sakai et al. |
| 2006/0195325 | A1 | 8/2006 | Tateson et al. |
| 2007/0100796 | A1 | 5/2007 | Wang |

FOREIGN PATENT DOCUMENTS

| | | | |
|---|---|---|---|
| JP | 06-332990 | A | 12/1994 |
| JP | 07-234881 | A | 9/1995 |
| JP | 09-265478 | A | 10/1997 |
| WO | 95/29451 | A1 | 11/1995 |
| WO | 99/06924 | A1 | 2/1999 |
| WO | 02/19167 | A2 | 3/2002 |

OTHER PUBLICATIONS

"Distributed Search Patent", http://software.infoseek.com/patents/dist_search/Default.htm,(Accessed Dec. 21, 1998).

"Final Office Action dated Oct. 6, 2003", Japan Application 2000-534960, 2 pages.

"Final Office Action dated Oct. 6, 2003", U.S. Appl. No. 09/344,802, 12 pages.

"Final Office Action dated Mar. 13, 2009", U.S. Appl. No. 11/118,118, 12 pages.

"Final Office Action dated Apr. 17, 2007", U.S. Appl. No. 11/107,546, 7 pages.

"Final Office Action dated May 11, 2009", U.S. Appl. No. 11/537,364, 14 pages.

"Final Office Action dated Jun. 2, 2005", U.S. Appl. No. 09/847,954, 8 pages.

"Final Office Action dated Sep. 24, 2010", Japan Application 2000-534960, 2 pages.

"First Office Action dated Jan. 6, 2009", Japan Application 2000-534960, 11 pages.

"Infoseek Gets Patent on Internet Search Technique", http://software.infoseek.com/patents/dist_search/bg_info.htm (Accessed Dec. 21, 1998).

"International Search Report dated Apr. 26, 1999", International Application No. PCT/US98/26985, 3 pages.

"Non Final Office Action dated Oct. 1, 2004", U.S. Appl. No. 09/344,802, 7 pages.

"Non Final Office Action dated Nov. 26, 2008", U.S. Appl. No. 11/537,364, 13 pages.

"Non Final Office Action dated Dec. 29, 2005", U.S. Appl. No. 09/847,954, 7 pages.

"Non Final Office Action dated Dec. 29, 2009", U.S. Appl. No. 11/877,822, 11 pages.

"Non Final Office Action dated Mar. 7, 2000", U.S. Appl. No. 09/041,081, 11 pages.

"Non Final Office Action dated Apr. 3, 2002", U.S. Appl. No. 09/344,802, 12 pages.

"Non Final Office Action dated Jun. 4, 2003", U.S. Appl. No. 09/344,802, 23 pages.

"Non Final Office Action dated Sep. 20, 2006", U.S. Appl. No. 11/107,546, 6 pages.

"Non Final Office Action dated Sep. 21, 1999", U.S. Appl. No. 09/041,081, 15 pages.

"Non Final Office Action dated Sep. 24, 2002", U.S. Appl. No. 09/344,802, 8 pages.

"Non Final Office Action dated Sep. 3, 2008", U.S. Appl. No. 11/118,118, 11 pages.

"Non Final Office Action dated Sep. 7, 2004", U.S. Appl. No. 09/847,954, 11 pages.

"Notice of Allowance dated Jan. 19, 2005", U.S. Appl. No. 09/344,802, 9 pages.

"Notice of Allowance dated Dec. 14, 2009", U.S. Appl. No. 11/537,364, 12 pages.

"Notice of Allowance dated Dec. 2, 2010", U.S. Appl. No. 11/877,822, 8 pages.

"Notice of Allowance dated Feb. 18, 2011", Japan Application 2000-534960, 6 pages.

"Notice of Allowance dated Feb. 25, 2011", U.S. Appl. No. 12/619,578, 13 pages.

"Notice of Allowance dated Mar. 12, 2010", U.S. Appl. No. 11/537,364, 9 pages.

"Notice of Allowance dated Jun. 13, 2006", U.S. Appl. No. 09/847,954, 7 pages.

"Notice of Allowance dated Jun. 29, 2010", U.S. Appl. No. 11/877,822, 7 pages.

"Notice of Allowance dated Jul. 6, 2009", U.S. Appl. No. 11/118,118, 8 pages.

"Notice of Allowance dated Aug. 22, 2007", U.S. Appl. No. 11/107,546, 5 pages.

"Notice of Allowance dated Sep. 30, 2010", U.S. Appl. No. 11/877,822, 9 pages.

"Office Action dated Jan. 25, 2002", Europe Application 98964094.1, 3 pages.

"Office Action dated Jul. 10, 2001", Europe Application 98964094.1, 3 pages.

"PLS Speeds Time to Market for Content-Rich Web Sites With PL Web Turbo Version 2.6; New Version Delivers Open Platform Support and Flexible Interface Design", Copyright 1996 PR Newswire Association, Inc., PR Newswire, Financial News Section, Sep. 14, 1996.

"Sageware introduces Knowledge Sets for Verity's Line of Information Searching Porducts; Pre-Defined Searches Simplify Specific Information Needs", Copyright 1996 PR Newswire Association, Inc., Financial News Section, May 28, 1996.

"Searching Far and Wide: The Powerful Document Retrieval Software of PLS, part 2", Copyright 1996 Information Access Company, a Thomson Corporation Company, IAC(SM) Industry Express(SM), Copyright 1996 Seybold Publications Inc., Seybold Report on Desktop Publishing, vol. 10, No. 8, Apr. 22, 1996.

"Searching Far and Wide: The Powerful Document Retrieval Software of PLS, part 3", Copyright 1996 Information Access Company, a Thomson Corporation Company, IAC(SM) Industry Express(SM), Copyright 1996 Syebold Publications Inc., Seybold Report on Desktop Publishing, vol. 10; No. 8, Apr. 22, 1996.

Banet, Bernard , "Searching Far and Wide: The Powerful Document Retrieval Software of PLS, part 1", Copyright 1996 Information Access Company, a Thomson Corporation Company, IAC(SM) Industry Express(SM), Copyright 1996 Seybold Publications Inc., Seybold Report on Desktop Publishing, vol. 10, No. 8, Apr. 22, 1996.

(56) References Cited

OTHER PUBLICATIONS

Brooks, Peter L., "Looking for Data in All the Wrong Places; Finding Data in Free-form Data Sources; Technology Information", Information Access Company, a Thomson Corporation Company; ASAP, MT&T Pbulishing Inc., DBMS, Section : No. 11, vol. 10, 1997, pp. 70.

Courtois, Martin P. et al., "Cool Tools for Searching the Web; World Wide Web Search Databases; Includes Related Articles", Copyright 1995 Information Access Company, a Thomson Corporations Company, ASAP, Copyright 1995 Online Inc., Online, vol. 19; No. 6, 1995, pp. 14.

Jurvis, Jeff, "Serving up Knowledge", UMI, Inc.; ABI/INFORM; CMP Media Inc., Informationweek: Section No. 657, Nov. 17, 2007, pp. 141-150.

Klinger, Steve, "Serring the Internet the Easy Way", LAN Times, CMP Media vol. 14, Issue 10, May 12, 1997, pp. 56.

Lundquist, Carol et al., "A Parallel Relational Database Management System Approach to Relevance Feedback in Information Retrieval", Journal of the American Society for Information Science, vol. 50, issue 5, 14 pages, Apr. 15, 1999, pp. 413.

Munro, Kathryn, "Filtering Utilities", Copyright 1997 Information Access Company, a Thomson Corporation Company, IAC(SM) Industry Express(SM), Copyright 1997 Ziff-Davis Publishing Company, PC Magazine, vol. 16, No. 7, Apr. 8, 1997, pp. 235.

Munson, Kurt I., "World Wide Web Indexes and Hierarchial Lists; Finding Tools for The Internet.", Computers in Libraries, vol. 16; No. 6, 1996, pp. 54.

Notess, Greg, "Northern Light: New Search Engine for the Web and Full-Text Articles; Includes Related Article", Copyright 1998 Information Access Compnay, a Thomson Corporation Company, ASAP Coypright 1998 Online Inc., Database, No. 1, vol. 21., Feb. 12, 1998, pp. 32.

Paul, Nora, "News Archives: One-Stop Shopping, Boutique Hopping and the Specialty News Search Site; Includes Related Article Bathe of the Search Engines", Copyright 1998 Information Access Company, a Thomson Corporation Company, ASAP, Copyright 1998 Information Today, Inc., Searcher, No. 1; vol. 6, 1998, pp. 64.

Sheldon, Mark A. et al., "Discover: A Resource Discovery System Based on Content Routing", Computer Networks and ISDN Systems, vol. 27, No. 6, 1995, pp. 953-972.

Smith, Charles, "Auctions: The Construction of Social Values", University of California Press, 1989, pp. 2-3,64-65,164-165,168-172.

* cited by examiner

| | item rating table | ╱— 300 |
|---|---|---|
| term | item identifer | score |
| ⋮ | ⋮ | |
| dynamics | 0801062272 | 1 |
| dynamics | 1883823064 | 22 |
| dynamics | 9676530409 | 7 |
| ⋮ | ⋮ | |
| human | 0814403484 | 16 |
| human | 1883823064 | 45 |
| human | 6303702473 | 3 |
| | ⋮ | |

*FIG. 3* category/item rating table — 3A00

| category | term | item identifier | score |
|---|---|---|---|
| ⋮ | ⋮ | ⋮ | ⋮ |
| science | dynamics | 0801062272 | 1 |
| science | dynamics | 9676530409 | 7 |
| ⋮ | | | |
| science | human | 6303702473 | 3 |
| ⋮ | ⋮ | ⋮ | ⋮ |
| social science | dynamics | 1883823064 | 23 |
| ⋮ | ⋮ | ⋮ | ⋮ |
| social science | human | 1883823064 | 46 |
| social science | human | 0814403484 | 16 |
| ⋮ | ⋮ | ⋮ | ⋮ |

3A01 → science / dynamics / 0801062272 / 1
3A02 → science / dynamics / 9676530409 / 7
3A03 → science / human / 6303702473 / 3
3A04 → social science / dynamics / 1883823064 / 23
3A05 → social science / human / 1883823064 / 46
3A06 → social science / human / 0814403484 / 16

*FIG. 3A* item rating table — 400

| term | item identifer | score |
|---|---|---|
| ⋮ | ⋮ | ⋮ |
| dynamics | 0801062272 | 1 |
| dynamics | 1883823064 | 23 |
| dynamics | 9676530409 | 7 |
| ⋮ | ⋮ | |
| human | 0814403484 | 16 |
| human | 1883823064 | 46 |
| human | 6303702473 | 3 |
| | ⋮ | |

401 → dynamics 0801062272 1
402 → dynamics 1883823064 23
403 → dynamics 9676530409 7
404 → human 0814403484 16
405 → human 1883823064 46
406 → human 6303702473 3

*FIG. 4*

| term | item identifer | score |
|---|---|---|
| ⋮ | ⋮ | |
| dynamics | 0801062272 | 4 |
| dynamics | 1883823064 | 116 |
| dynamics | 1887650024 | 2 |
| dynamics | 9676530409 | 45 |
| ⋮ | | |
| human | 0814403484 | 77 |
| human | 1883823064 | 211 |
| human | 6303702473 | 12 |
| ⋮ | | | item rating table — 600

*FIG. 6*

IDENTIFYING ITEMS RELEVANT TO A CURRENT QUERY BASED ON ITEMS ACCESSED IN CONNECTION WITH SIMILAR QUERIES

CROSS-REFERENCE TO RELATED APPLICATIONS

This application is a continuation of U.S. patent application Ser. No. 12/619,578, filed on Nov. 16, 2009, which is a continuation of U.S. patent application Ser. No. 11/118,118, filed Apr. 29, 2005, which is a continuation of U.S. patent application Ser. No. 09/344,802, filed Jun. 25, 1999, now U.S. Pat. No. 7,050,992, issued May 23, 2006, which is a continuation-in-part of U.S. patent application Ser. No. 09/041,081, filed Mar. 10, 1998, now U.S. Pat. No. 6,185,558, issued Feb. 6, 2001, which is a continuation-in-part of U.S. patent application Ser. No. 09/033,824 filed Mar. 3, 1998. These applications are hereby incorporated by reference.

TECHNICAL FIELD

The present invention is directed to the field of query processing.

BACKGROUND

Many World Wide Web sites permit users to perform searches to identify a small number of interesting items among a much larger domain of items. As an example, several web index sites permit users to search for particular web sites among most of the known web sites. Similarly, many online merchants, such as booksellers, permit users to search for particular products among all of the products that can be purchased from a merchant. Also, some web sites allow users to list products or services, or more generally any exchangeable entity, to be auctioned. An auction web site allows potential bidders to search for auctions of interest and then place a bid on the exchangeable entity being auctioned. In many cases, users perform searches in order to ultimately find a single item within an entire domain of items.

In order to perform a search, a user submits a query or selection specification containing one or more query terms. The query also explicitly or implicitly identifies a domain of items to search. For example, a user may submit a query to an online bookseller containing terms that the user believes are words in the title of a book. A query server program processes the query to identify within the domain items matching the terms of the query. The items identified by the query server program are collectively known as a query result. In the example, the query result is a list of books whose titles contain some or all of the query terms. The query result is typically displayed to the user as a list of items. This list may be ordered in various ways. For example, the list may be ordered alphabetically or numerically based on a property of each item, such as the title, author, or release date of each book. As another example, the list may be ordered based on the extent to which each identified item matches the terms of the query.

When the domain for a query contains a large number of items, it is common for query results to contain tens or hundreds of items. Where the user is performing the search in order to find a single item, application of conventional approaches to ordering the query result often fail to place the sought item or items near the top of the query result, so that the user must read through many other items in the query result before reaching the sought item. In view of this disadvantage of conventional approaches to ordering query results, a new, more effective technique for automatically ordering query results in accordance with collective and individual user behavior would have significant utility.

Further, it is fairly common for users to specify queries that are not satisfied by any items. This may happen, for example, where a user submits a detailed query that is very narrow, or where a user mistypes or misremembers a term in the query. In such cases, conventional techniques, which present only items that satisfy the query, present no items to the user. When no items are presented to a user in response to issuing a query, the user can become frustrated with the search engine, and may even discontinue its use. Accordingly, a technique for displaying items relating to at least some of the terms in a query even when no items completely match the query would have significant utility.

In order to satisfy this need, some search engines adopt a strategy of effectively automatically revising the query until a non-empty result set is produced. For example, a search engine may progressively delete conjunctive, i.e., ANDed, terms from a multiple term query until the result set produced for that query contains items. This strategy has the disadvantage that important information for choosing the correct items can be lost when query terms are arbitrarily deleted. As a result, the first non-empty result set can be quite large, and may contain a large percentage of items that are irrelevant to the original query as a whole. For this reason, a more effective technique for displaying items relating to at least some of the terms in a query even when no items completely match the query would have significant utility.

SUMMARY

The present invention provides a software facility ("the facility") for identifying the items most relevant to a current query based on items selected in connection with similar queries. The facility preferably generates ranking values for items indicating their level of relevance to the current query, which specifies one or more query terms. The facility generates a ranking value for an item by combining rating scores, produced by a rating function, that each correspond to the level of relevance of the item to queries containing one of the ranking values. The rating function preferably retrieves a rating score for the combination of an item and a term from a rating table generated by the facility. The scores in the rating table preferably reflect, for a particular item and term, how often users have selected the item when the item has been identified in query results produced for queries containing particular term.

In different embodiments, the facility uses the rating scores to either generate a ranking value for each item in a query result, or generate ranking values for a smaller number of items in order to select a few items having the top ranking values. To generate a ranking value for a particular item in a query result, the facility combines the rating scores corresponding to that item and the terms of the query. In embodiments in which the goal is to generate ranking values for each item in the query result, the facility preferably loops through the items in the query results and, for each item, combines all of the rating scores corresponding to that item and any of the terms in the query. On the other hand, in embodiments in which the goal is to select a few items in the query result having the largest ranking values, the facility preferably loops through the terms in the query, and, for each item, identifies the top few rating scores for that term and any item. The facility then combines the scores identified for each item to generate ranking values for a relatively small number of items, which may include items not identified in the query result. Indeed, these embodiments of the invention are able to generate ranking values for and display items even in cases in which the query result is empty, i.e., when no items completely satisfy the query.

Once the facility has generated ranking values for at least some items, the facility preferably orders the items of the query result in decreasing order of ranking value. The facility may also use the ranking values to subset the items in the query result to a smaller number of items. By ordering and/or subsetting the items in the query result in this way in accordance with collective and individual user behavior rather than in accordance with attributes of the items, the facility substantially increases the likelihood that the user will quickly find within the query result the particular item or items that he or she seeks. For example, while a query result for a query containing the query terms "human" and "dynamic" may contain a book about human dynamics and a book about the effects on human beings of particle dynamics, selections by users from early query results produced for queries containing the term "human" show that these users select the human dynamics book much more frequently than they select the particle dynamics book. The facility therefore ranks the human dynamics book higher than the particle dynamics book, allowing users that are more interested in the human dynamics book to select it more easily. This benefit of the facility is especially useful in conjunction with the large, heterogeneous query results that are typically generated for single-term queries, which are commonly submitted by users.

Various embodiments of the invention base rating scores on different kinds of selection actions performed by the users on items identified in query results. These include whether the user displayed additional information about an item, how much time the user spent viewing the additional information about the item, how many hyperlinks the user followed within the additional information about the item, whether the user added the item to his or her shopping basket, and whether the user ultimately purchased the item. Embodiments of the invention also consider selection actions not relating to query results, such as typing an item's item identifier rather than choosing the item from a query result. Additional embodiments of the invention incorporate into the ranking process information about the user submitting the query by maintaining and applying separate rating scores for users in different demographic groups, such as those of the same sex, age, income, or geographic category. Certain embodiments also incorporate behavioral information about specific users. Further, rating scores may be produced by a rating function that combines different types of information reflecting collective and individual user preferences. Some embodiments of the invention utilize specialized strategies for incorporating into the rating scores information about queries submitted in different time frames.

BRIEF DESCRIPTION OF THE DRAWINGS

FIG. 3A is a table diagram corresponding to the table of FIG. 3 when queries can specify a category.

FIGS. 3 and 4 are table diagrams showing augmentation of an item rating table in accordance with step 206 (FIG. 2).

FIG. 6 is a table diagram showing a rating table for a composite period.

DETAILED DESCRIPTION

Figure 1:
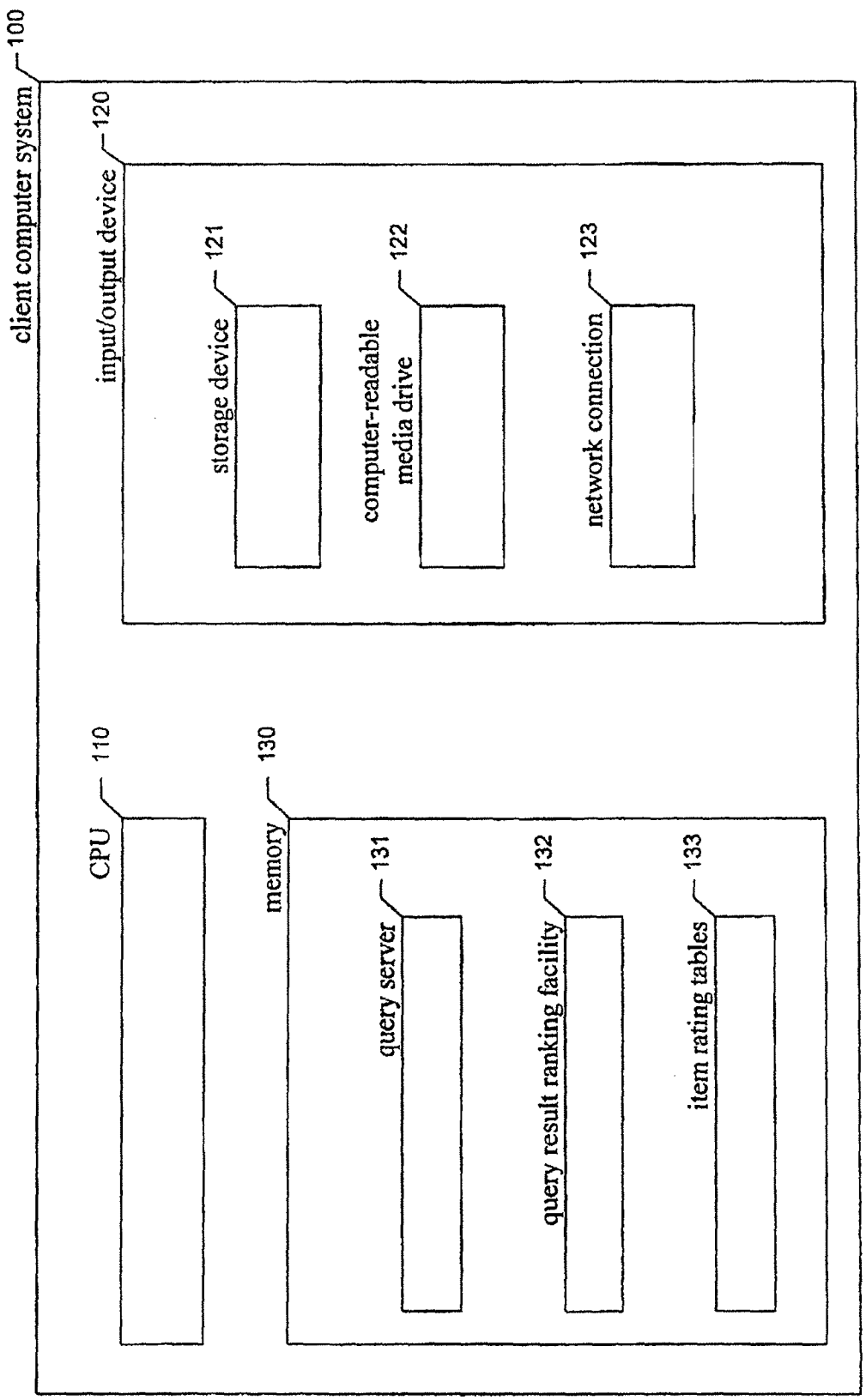
FIG. 1 is a high-level block diagram showing the computer system upon which the facility preferably executes.

The present invention provides a software facility ("the facility") for identifying the items most relevant to a current query based on items selected in connection with similar queries. The facility preferably generates ranking values for items indicating their level of relevance to the current query, which specifies one or more query teens. The facility generates a ranking value for an item by combining rating scores, produced by a rating function, that each correspond to the level of relevance of the item to queries containing one of the ranking values. The rating function preferably retrieves a rating score for the combination of an item and a term from a rating table generated by the facility. The scores in the rating table preferably reflect, for a particular item and term, how often users have selected the item when the item has been identified in query results produced for queries containing the term.

In different embodiments, the facility uses the rating scores to either generate a ranking value for each item in a query result, or generate ranking values for a smaller number of items in order to select a few items having the top ranking values. To generate a ranking value for a particular item in a query result, the facility combines the rating scores corresponding to that item and the terms of the query. In embodiments in which the goal is to generate ranking values for each item in the query result, the facility preferably loops through the items in the query results and, for each item, combines all of the rating scores corresponding to that item and any of the terms in the query. On the other hand, in embodiments in which the goal is to select a few items in the query result having the largest ranking values, the facility preferably loops through the terms in the query, and, for each item, identifies the top few rating scores for that term and any item. The facility then combines the scores identified for each item to generate ranking values for a relatively small number of items, which may include items not identified in the query result. Indeed, these embodiments of the invention are able to generate ranking values for and display items even in cases in which the query result is empty, i.e., when no items completely satisfy the query.

Once the facility has generated ranking values for at least some items, the facility preferably orders the items of the query result in decreasing order of ranking value. The facility may also use the ranking values to subset the items in the query result to a smaller number of items. By ordering and/or subsetting the items in the query result in this way in accordance with collective and individual user behavior rather than in accordance with attributes of the items, the facility substantially increases the likelihood that the user will quickly find within the query result the particular item or items that he or she seeks. For example, while a query result for a query containing the query terms "human" and "dynamic" may contain a book about human dynamics and a book about the effects on human beings of particle dynamics, selections by users from early query results produced for queries containing the term "human" show that these users select the human dynamics book much more frequently than they select the particle dynamics book. The facility therefore ranks the human dynamics book higher than the particle dynamics book, allowing users, most of whom are more interested in the human dynamics book, to select it more easily. This benefit of the facility is especially useful in conjunction with the large, heterogeneous query results that are typically generated for single-term queries, which are commonly submitted by users.

Various embodiments of the invention base rating scores on different kinds of selection actions performed by the users on items identified in query results. These include whether the user displayed additional information about an item, how much time the user spent viewing the additional information about the item, how many hyperlinks the user followed within the additional information about the item, whether the user added the item to his or her shopping basket, and whether the user ultimately purchased the item. In one embodiment, the facility allows users to search auctions of interest by specifying a query. The query results may be presented as auction titles along with links to web pages that describe the auctions in detail. The facility may base the rating score of relevant auctions on various selection actions such as the number of times users selected the auction and the number of times that users placed a bid at that auction. Embodiments of the invention also consider selection actions not relating to query results, such as typing an item's item identifier rather than choosing the item from a query result. Also, the facility may adjust the rating score for an item based on the item's position on a page. For example, the facility may increase the rating score for items that are listed near the end of a query result. The scrolling through a list to select an item may tend to indicate that the item is relevant. Additional embodiments of the invention incorporate into the ranking process information about the user submitting the query by maintaining and applying separate rating scores for users in different demographic groups, such as those of the same sex, age, income, or geographic category. Certain embodiments also incorporate behavioral information about specific users. Further, rating scores may be produced by a rating function that combines different types of information reflecting collective and individual user preferences. Some embodiments of the invention utilize specialized strategies for incorporating into the rating scores information about queries submitted in different time frames.

The domain of items that can be searched may be organized into classifications or categories, which may be hierarchical or nonhierarchical in nature. A hierarchical organization can be represented by a tree data structure or a tree-like data structure in which a classification can have two parent classifications, and a nonhierarchical organization can be represented by a general graph data structure. For example, auctions may be organized based on the products being auctioned. The highest categories of auctions may include "antiques," "books," "clothing," "coins" and so on. The "coins" category may be further sub-categorized into "international coins" and "U.S. coins." The "U.S. coins" category may have the sub-categories of "cents," "nickels," and so on. In one embodiment, the facility allows a query for a domain to be limited to a certain category within that domain. For example, a user may specify a category of "U.S. coins" and then specify a query to be performed on items in that category.

FIG. 1 is a high-level block diagram showing the computer system upon which the facility preferably executes. As shown in FIG. 1, the computer system 100 comprises a central processing unit (CPU) 110, input/output devices 120, and a computer memory (memory) 130. Among the input/output devices is a storage device 121, such as a hard disk drive; a computer-readable media drive 122, which can be used to install software products, including the facility, which are provided on a computer-readable medium, such as a CD-ROM; and a network connection 123 for connection the computer system 100 to other computer systems (not shown). The memory 130 preferably contains a query server 131 for generating query results from queries, a query result ranking facility 132 for automatically ranking the items in a query result in accordance with collective user preferences, and item rating tables 133 used by the facility. While the facility is preferably implemented on a computer system configured as described above, those skilled in the art will recognize that it may also be implemented on computer systems having different configurations.

Figure 2:
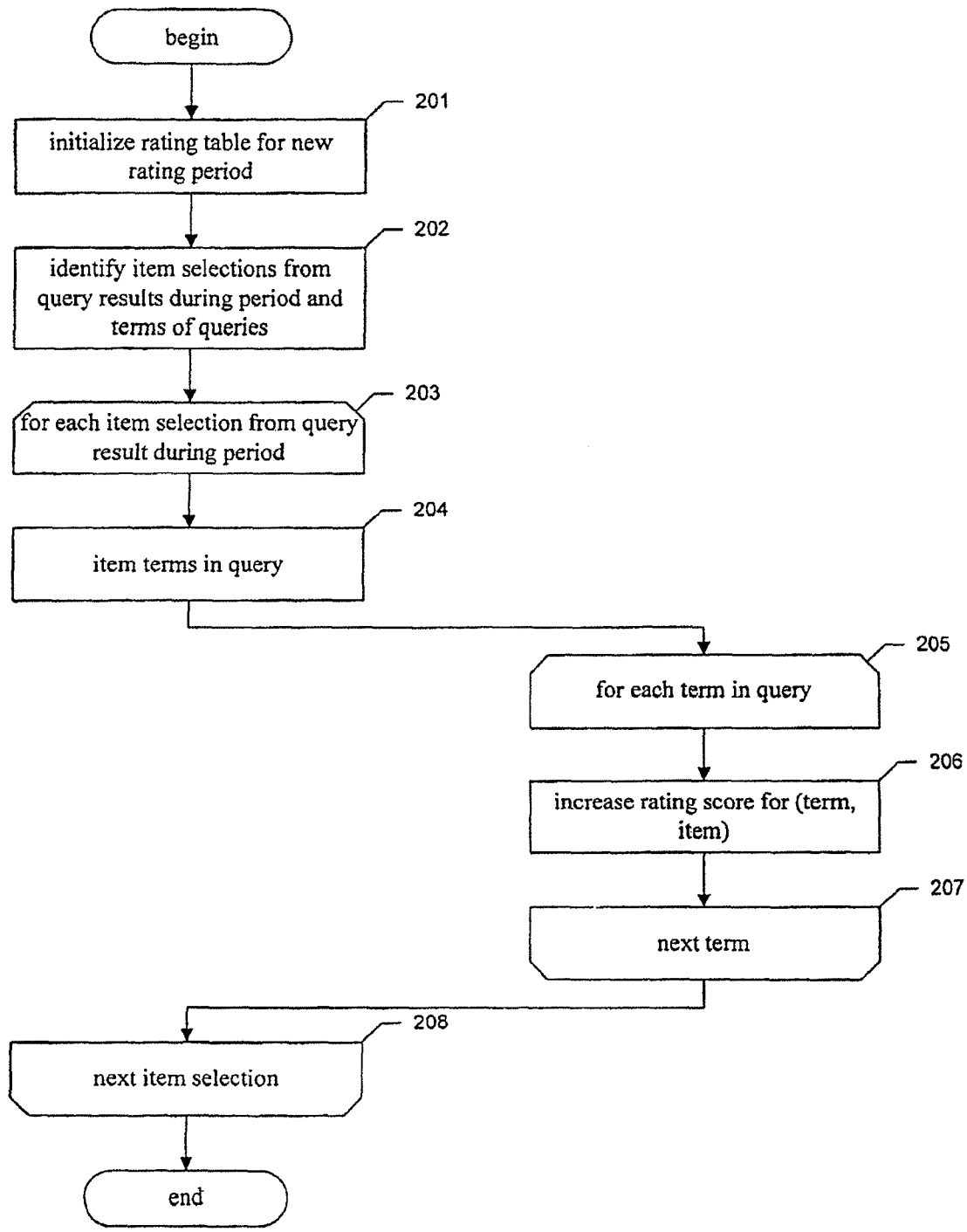
FIG. 2 is a flow diagram showing the steps preferably performed by the facility in order to generate a new rating table.

The facility preferably generates a new rating table periodically, and, when a query result is received, uses the last-generated rating table to rank the items in the query result. FIG. 2 is a flow diagram showing the steps preferably performed by the facility in order to generate a new rating table. In step 201, the facility initializes a rating table for holding entries each indicating the rating score for a particular combination of a query term and an item identifier. The rating table preferably has no entries when it is initialized. In step 202, the facility identifies all of the query result item selections made by users during the period of time for which the rating table is being generated. The rating table may be generated for the queries occurring during a period of time such as a day, a week, or month. This group of queries is termed a "rating set" of queries. The facility also identifies the terms of the queries that produced these query results in step 202. Performance of step 202 is discussed in greater detail below in conjunction with FIG. 7. In steps 204-208, the facility loops through each item selection from a query result that was made by a user during the time period. In step 204, the facility identifies the terms used in the query that produced the query result in which the item selection took place. If the query included a category specification, then each term may be considered to include that category. For example, if the category is specified to be "U.S. coins" and the terms to be "Indian Head," then the terms that are identified are "U.S. coins/Indian" and "U.S. coins/Head." In steps 205-207, the facility loops through each term in the query. In step 206, the facility increases the rating score in the rating table corresponding to the current term and item. Where an entry does not yet exist in the rating table for the term and item, the facility adds a new entry to the rating table for the term and item. Increasing the rating score preferably involves adding an increment value, such as 1, to the existing rating score for the term and item. In step 207, if additional terms remain to be processed, the facility loops back to step 205 to process the next term in the query, else the facility continues in step 208. In step 208, if additional item selections remain to be processed, then the facility loops back to step 203 to process the next item selection, else these steps conclude.

FIGS. 3 and 4 are table diagrams showing augmentation of an item rating table in accordance with step 206 (FIG. 2). FIG. 3 shows the state of the item rating table before its augmentation. It can be seen that the table 300 contains a number of entries, including entries 301-306. Each entry contains the rating score for a particular combination of a query term and an item identifier. For example, entry 302 identifies the score "22" for the term "dynamics" the item identifier "1883823064." It can be seen by examining entries 301-303 that, in query results produced from queries including the term "dynamics", and the item having item identifier "1883823064" has been selected by users more frequently than the item having item identifier "9676530409", and much more frequently than the item having item identifier "0801062272". In additional embodiments, the facility uses various other data structures to store the rating scores, such as sparse arrays.

In augmenting the item rating table 300, the facility identifies the selection of the item having item identifier "1883823064" from a query result produced by a query specifying the query terms "human" and "dynamics". FIG. 4 shows the state of the item rating table after the item rating table is augmented by the facility to reflect this selection. It can be seen by comparing entry 405 in item rating table 400 to entry 305 in item rating table 300 that the facility has incremented the score for this entry from "45" to "46". Similarly, the facility has incremented the rating score for this item identifier the term "dynamics" from "22" to "23". The facility augments the rating table in a similar manner for the other selections from query results that it identifies during the time period.

FIG. 3A is a table diagram corresponding to the table of FIG. 3 when queries can specify a category. In this example, the category/item rating table 3A00 includes a category column. Whenever a query is identified that specifies a category, the facility uses the combination of category and term of the query to identify an entry in the category/rating table and to update the score for that entry. The facility may order the query results of a query that specifies a category based on selection actions or access patterns associated with other queries that specified the same category. If a query does not specify a category, then the category column for that entry may be left empty. The facility may order query results of a query that does not specify a category based on selection actions associated with the other queries that did not specify a category. Alternatively, the facility can also base the ordering of query results of a query that does not specify a category on selection actions associated with queries that do specify a category, and vice versa. For example, if the category/rating table has no entry corresponding to a combination of a category and teen, the facility may base the ordering on entries for that term which do not specify a category or which specify a different category. In general, the facility may use entries with matching teem values that do not have matching category values when ordering query results. The entries with category values that do not match may be weighted less than entries with matching category values.

Figure 5:
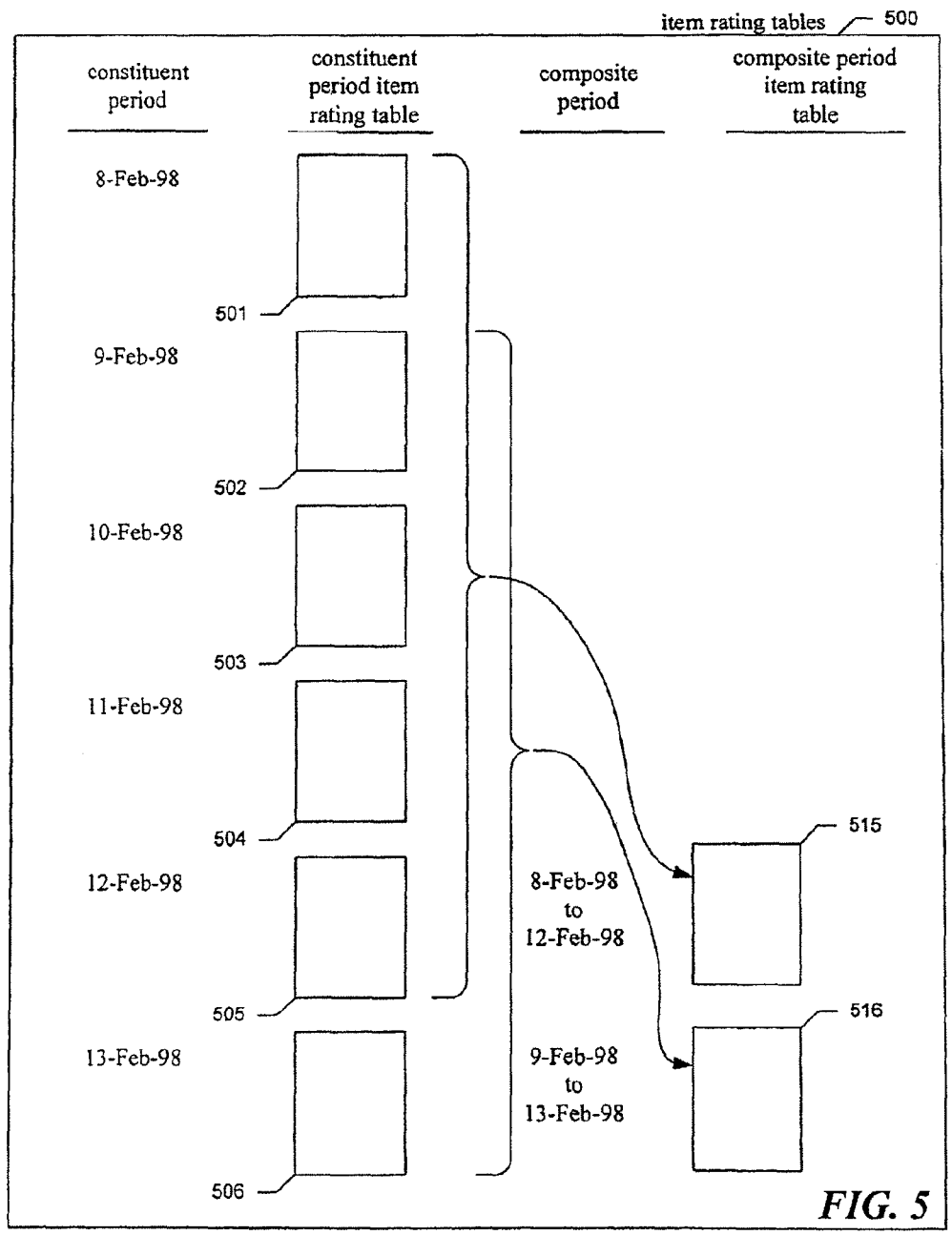
FIG. 5 is a table diagram showing the generation of rating tables for composite periods of time from rating tables for constituent periods of time.

Rather than generating a new rating table from scratch using the steps shown in FIG. 2 each time new selection information becomes available, the facility preferably generates and maintains separate rating tables for different constituent time periods, of a relatively short length, such as one day. Each time a rating table is generated for a new constituent time period, the facility preferably combines this new rating table with existing rating tables for earlier constituent time periods to form a rating table for a longer composite period of time. FIG. 5 is a table diagram showing the generation of rating tables for composite periods of time from rating tables for constituent periods of time. It can be seen in FIG. 5 that rating tables 501-506 each correspond to a single day between 8 Feb. 98 and 13 Feb. 98. Each time a new constituent period is completed, the facility generates a new rating table reflecting the user selections made during that constituent period. For example, at the end of 12 Feb. 98, the facility generates rating table 505, which reflects all of the user selections occurring during 12 Feb. 98. After the facility generates a new rating table for a completed constituent period, the facility also generates a new rating table for a composite period ending with that constituent period. For example, after generating the rating table 505 for the constituent period 12 Feb. 98, the facility generates rating table 515 for the composite period 8 Feb. 98 to 12 Feb. 98. The facility preferably generates such a rating table for a composite period by combining the entries of the rating tables for the constituent periods making up the composite period, and combining the scores of corresponding entries, for example, by summing them. In one preferred embodiment, the scores and rating tables for more recent constituent periods are weighted more heavily than those in rating tables for less recent constituent periods. When ranking query results, the rating table for the most recent composite period is preferably used. That is, until rating table 516 can be generated, the facility preferably uses rating table 515 to rank query results. After rating table 516 is generated, the facility preferably uses rating table 516 to rank query results. The lengths of both constituent periods and composite periods are preferably configurable.

FIG. 6 is a table diagram showing a rating table for a composite period. By comparing the item rating table 600 shown in FIG. 6 to item rating table 400 shown in FIG. 4, it can be seen that the contents of rating table 600 constitute the combination of the contents of rating table 400 with several other rating tables for constituent periods. For example, the score for entry 602 is "116", or about five times the score for corresponding entry 402. Further, although rating table 400 does not contain an entry for the term "dynamics" and the item identifier "1887650024", entry 607 has been added to table 600 for this combination of term and item identifier, as a corresponding entry occurs in a rating table for one of the other constituent periods within the composite period.

The process used by the facility to identify user selections is dependent upon both the kind of selection action used by the facility and the manner in which the data relating to such selection actions is stored. One preferred embodiment uses as its selection action requests to display more information about items identified in query results. In this embodiment, the facility extracts this information from logs generated by a web server that generates query results for a user using a web client, and allows the user to select an item with the web client in order display additional information about it. A web server generally maintains a log detailing of all the HTTP requests that it has received from web clients and responded to. Such a log is generally made up of entries, each containing information about a different HTTP request. Such logs are generally organized chronologically. Log Entry 1 below is a sample log entry showing an HTTP request submitted by a web client on behalf of the user that submits a query.

1. Friday, 13-Feb-98 16:59:27
2. User Identifier=82707238671
3. HTTP_REFERER=http://www.amazon.com/book_query_page
4. PATH_INFO=/book_query
5. author="Seagal"
6. title="Human Dynamics"

Log Entry 1

It can be seen by the occurrence of the keyword "book_query" in the "PATH_INFO" line 4 of Log Entry 1 that this log entry corresponds to a user's submission of a query. It further can be seen in term lines 5 and 6 that the query includes the terms "Seagal", "Human", and "Dynamics". In line 2, the entry further contains a user identifier corresponding to the identity of the user and, in some embodiments, also to this particular interaction with the web server.

In response to receiving the HTTP request documented in Log Entry 1, the query server generates a query result for the query and returns it to the web client submitting the query. Later the user selects an item identified in the query result, and the web client submits another HTTP request to display detailed information about the selected item. Log Entry 2, which occurs at a point after Log Entry 1 in the log, describes this second HTTP request.

1. Friday, 13-Feb-98 17:02:39
2. User Identifier=82707238671
3. HTTP_REFERER=http://www.amazon.com/book_query
4. PATH_INFO=ASBN=1883823064

Log Entry 2

By comparing the user identifier in line 2 of Log Entry 2 to the user identifier in line 2 of Log Entry 1, it can be seen that these log entries correspond to the same user and time frame. In the "PATH_INFO" line 4 of Log Entry 2, it can be seen that the user has selected an item having item identifier ("ISBN") "1883823064". It can further be seen from the occurrence of the keyword "book_query" on the "HTTP_REFERER" line 3 that the selection of this item was from a query result.

Where information about user selections is stored in web server logs such as those discussed above, the facility preferably identifies user selections by traversing these logs. Such traversal can occur either in a batch processing mode after a log for a specific period of time has been completely generated, or in a real-time processing mode so that log entries are processed as soon as they are generated.

Figure 7:
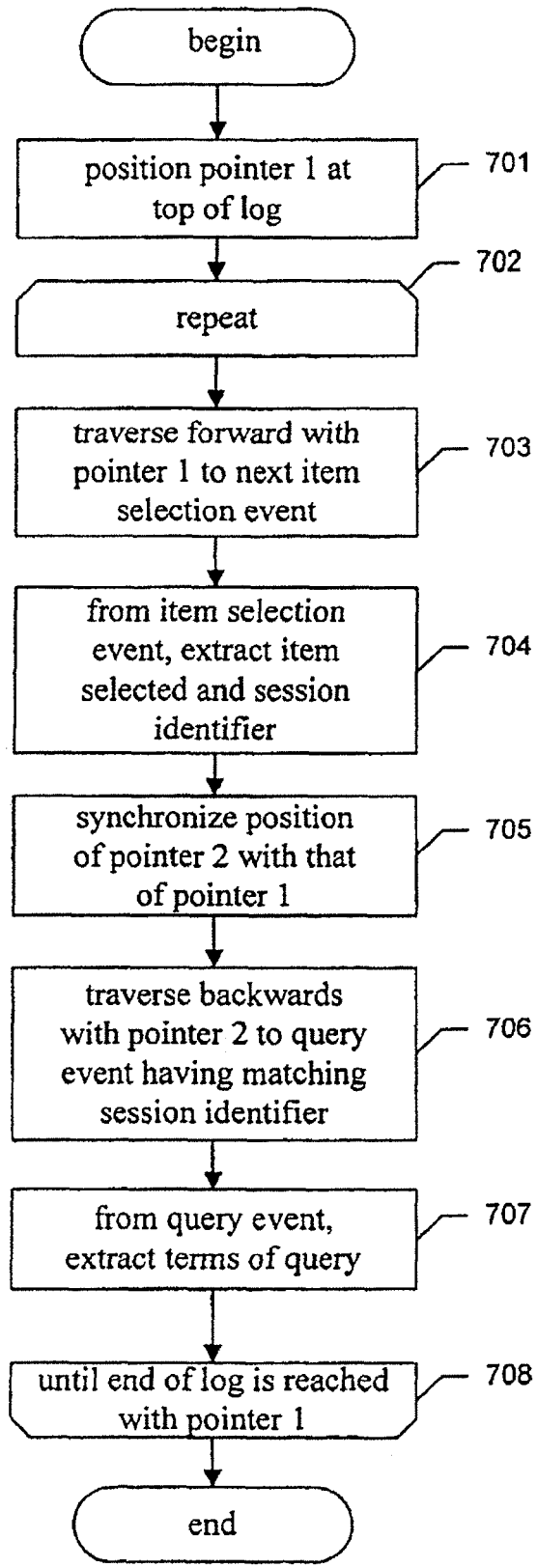
FIG. 7 is a flow diagram showing the steps preferably performed by the facility in order to identify user selections within a web server log.

FIG. 7 is a flow diagram showing the steps preferably performed by the facility in order to identify user selections within a web server log. In step 701, the facility positions a first pointer at the top, or beginning, of the log. The facility then repeats steps 702-708 until the first pointer reaches the end of the log. In step 703, the facility traverses forward with the first pointer to the next item selection event. In terms of the log entry shown above, step 703 involves traversing forward through log entries until one is found that contains in its "HTTP_REFERER" line a keyword denoting a search entry, such as "book_query". In step 704, the facility extracts from this item selection event the identity of the item that was selected and session identifier that identifies the user that selected the item. In terms of the log entries above, this involves reading the ten-digit number following the string "ISBN=" in the "PATH_INFO" line of the log entry, and reading the user identifier from the "User Identifier" line of the log entry. Thus, in Log Entry 2, the facility extracts item identifier "1883823064" and session identifier "82707238761". In step 705, the facility synchronizes the position of the second pointer with the position of the first pointer. That is, the facility makes the second pointer point to the same log entry as the first pointer. In step 706, the facility traverses backwards with the second pointer to a query event having a matching user identifier. In terms of the log entries above, the facility traverses backward to the log entry having the keyword "book_query" in its "PATH_INFO" line, and having a matching user identifier on its "User Identifier" line. In step 707, the facility extracts from the query event to which the second pointer points the terms of the query. In terms of the query log entries above, the facility extracts the quoted words from the query log entry to which the second pointer points, in the lines after the "PATH_INFO" line. Thus, in Log Entry 1, the facility extracts the terms "Seagal", "Human", and "Dynamics". In step 708, if the first pointer has not yet reached the end of the log, then the facility loops back to step 702 to continue processing the log, else these steps conclude.

When other selection actions are used by the facility, extracting information about the selection from the web server log can be somewhat more involved. For example, where the facility uses purchase of the item as the selection action, instead of identifying a log entry describing a request by the user for more information about an item, like Log Entry 1, the facility instead identifies a log entry describing a request to purchase items in a "shopping basket." The facility then traverses backwards in the log, using the entries describing requests to add items to and remove items from the shopping basket to determine which items were in the shopping basket at the time of the request to purchase. The facility then continues traversing backward in the log to identify the log entry describing the query, like Log Entry 2, and to extract the search terms.

Rather than relying solely on a web server log where item purchase is the selection action that is used by the facility, the facility alternatively uses a database separate from the web server log to determine which items are purchased in each purchase transaction. This information from the database is then matched up with the log entry containing the query terms for the query from which item is selected for purchase. This hybrid approach, using the web server logs and a separate database, may be used for any of the different kinds of selection actions. Additionally, where a database separate from the web server log contains all the information necessary to augment the rating table, the facility may use the database exclusively, and avoid traversing the web server log.

Figure 8:
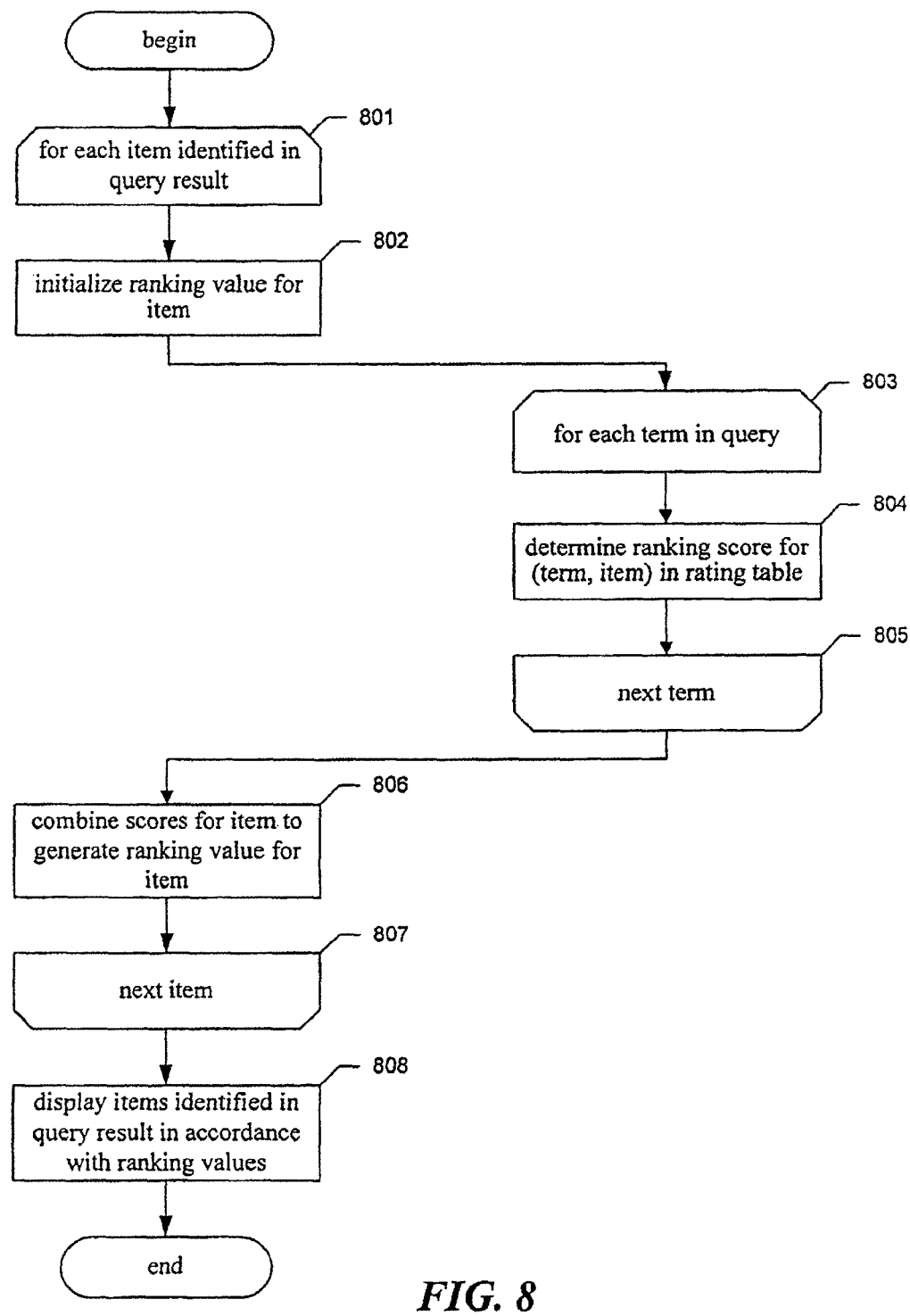
FIG. 8 is a flow diagram showing the steps preferably performed by the facility to order a query result using a rating table by generating a ranking value for each item in the query result.

The facility uses rating tables that it has generated to generate ranking values for items in new query results. FIG. 8 is a flow diagram showing the steps preferably performed by the facility to order a query result using a rating table by generating a ranking value for each item in the query result. In steps 801-807, the facility loops through each item identified in the query result. In step 802, the facility initializes a ranking value for the current item. In steps 803-805, the facility loops through each term occurring in the query. In step 804, the facility determines the rating score contained by the most recently-generated rating table for the current term and item. In step 805, if any terms of the query remain to be processed, then the facility loops up to step 803, else the facility continues in step 806. In step 806, the facility combines the scores for the current item to generate a ranking value for the item. As an example, with reference to FIG. 6, in processing datum having item identifier "1883823064", the facility combines the score "116" extracted from entry 602 for this item and the term "dynamics", and the score "211" extracted from entry 605 for this item and the term "human". Step 806 preferably involves summing these scores. These scores may be combined in other ways, however. In particular, scores may be adjusted to more directly reflect the number of query terms that are matched by the item, so that items that match more query terms than others are favored in the ranking. In step 807, if any items remain to be processed, the facility loops back to step 801 to process the next item, else the facility continues in step 808. In step 808, the facility displays the items identified in the query result in accordance with the ranking values generated for the items in step 806. Step 808 preferably involves sorting the items in the query result in decreasing order of their ranking values, and/or subsetting the items in the query result to include only those items above a threshold ranking value, or only a predetermined number of items having the highest ranking values. After step 808, these steps conclude.

Figure 9:
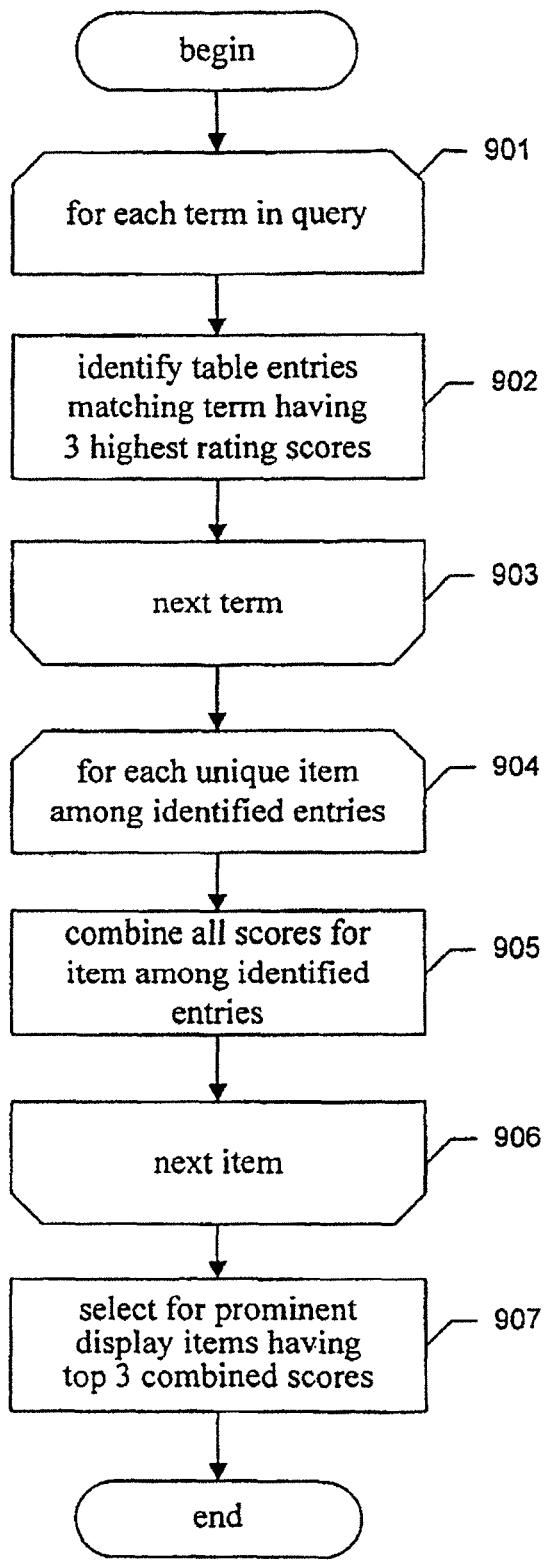
FIG. 9 is a flow diagram showing the steps preferably performed by the facility to select a few items in a query result having the highest ranking values using a rating table.

FIG. 9 is a flow diagram showing the steps preferably performed by the facility to select a few items in a query result having the highest ranking values using a rating table. In steps 901-903, the facility loops through each term in the query. In step 902, the facility identifies among the table entries for the current term and those entries having the three highest rating scores. For example, with reference to FIG. 6, if the only entries in item rating table 600 for the term "dynamics" are entries 601, 602, 603, and 607, the facility would identify entries 601, 602, and 603, which are the entries for the term "dynamics" having the three highest rating scores. In additional preferred embodiments, a small number of table entries other than three is used. In step 903, if additional terms remain in the query to be processed, then the facility loops back to step 901 to process the next term in the query, else the facility continues in step 904. In steps 904-906, the facility loops through each unique item among the identified entries. In step 905, the facility combines all of the scores for the item among the identified entries. In step 906, if additional unique items remain among the identified entries to be processed, then the facility loops back to step 904 to process the next unique item, else the facility continues in step 907. As an example, if, in item rating table 600, the facility selected entries 601, 602, and 603 for the term "dynamics", and selected entries 604, 605, and 606 for the term "human", then the facility would combine the scores "116" and "211" for the item having item identifier "1883823064", and would use the following single scores for the remaining item identifiers: "77" for the item having item identifier "0814403484", "45" for the item having item identifier "9676530409", "12" for the item having item identifier "6303702473", and "4" for the item having item identifier "0801062272". In step 907, the facility selects for prominent display items having the top three combined scores. In additional embodiments, the facility selects a small number of items having the top combined scores that is other than three. In the example discussed above, the facility would select for prominent display the items having item identifiers "1883823064", "0814403484", and "9676530409". Because the facility in step 907 selects items without regard for their presence in the query result, the facility may select items that are not in the query result. This aspect of this embodiment is particularly advantageous in situations in which a complete query result is not available when the facility is invoked. Such as the case, for instance, where the query server only provides a portion of the items satisfying the query at a time. This aspect of the invention is further advantageous in that, by selecting items without regard for their presence in the query result, the facility is able to select and display to the user items relating to the query even where the query result is empty, i.e., when no items completely satisfy the query. After step 907, these steps conclude.

While the present invention has been shown and described with reference to preferred embodiments, it will be understood by those skilled in the art that various changes or modifications in form and detail may be made without departing from the scope of the invention. For example, the facility may be used to rank query results of all types. The facility may use various formulae to determine in the case of each item selection, the amount by which to augment rating scores with respect to the selection. Further, the facility may employ various formulae to combine rating scores into a ranking value for an item. The facility may also use a variety of different kinds of selection actions to augment the rating table, and may augment the rating table for more than one kind of selection action at a time. Additionally, the facility, may augment the rating table to reflect selections by users other than human users, such as software agents or other types of artificial users.

The invention claimed is:

1. A computer-implemented method for identifying items in response to a query, comprising:
    under control of one or more computer systems configured with executable instructions,
        receiving a first query from a first user, the first query including one or more query terms;
        generating a first query result including one or more items corresponding to the first query;
        for each respective item in the first query result, determining a ranking value using one or more rating scores, each rating score corresponding to a respective query term and depending at least in part on a first frequency with which selection actions are performed by previous users with respect to the respective item, the selection actions being performed against previous query results generated in response to previous queries that include the respective query term; and
        presenting at least a portion of the first query result for display to the first user according to the ranking values.

2. The computer-implemented method of claim 1, wherein each rating score further depends at least in part on a type of selection action performed by a previous user.

3. The computer-implemented method of claim 2, wherein the type of selection action includes at least one of (i) causing display of additional information about the respective item, (ii) following a hyperlink within the additional information, (iii) adding the respective item to a tentative shopping list, and (iv) purchasing the respective item.

4. The computer-implemented method of claim 3, wherein each rating score further depends at least in part on a duration of time the previous user views the additional information.

5. The computer-implemented method of claim 3, wherein each rating score further depends at least in part on a number of hyperlinks the previous user follows within the additional information.

6. The computer-implemented method of claim 1, wherein each rating score further depends at least in part on a position of the respective item in a webpage when a previous user performs a selection action with respect to the respective item.

7. The computer-implemented method of claim 1, wherein the selection actions are performed by previous users corresponding to a first demographic group.

8. The computer-implemented method of claim 1, wherein the selection actions are performed by previous users during a first time frame.

9. The computer-implemented method of claim 8, wherein each rating score further depends at least in part on a second frequency with which selection actions are performed by previous users during a second time frame, the second time frame being more recent than the first time frame, and wherein the second frequency is given more weight than the first frequency.

10. The computer-implemented method of claim 1, wherein determining comprises computing a sum of the one or more rating scores.

11. The computer-implemented method of claim 1, wherein determining comprises (i) computing a sum of the one or more rating scores, and (ii) adding a factor to the sum, wherein the factor is proportional to a number of rating scores included in the sum.

12. A non-transitory computer-readable storage medium having a computer readable program code embodied therein for identifying items in response to a query, the computer-readable program code when executed by at least one processor causing the at least one processor to:

receive a first query from a first user, the first query including one or more query terms;

generate a first query result including one or more items corresponding to the first query;

for each respective item in the first query result, determine a ranking value using one or more rating scores, each rating score corresponding to a respective query term and depending at least in part on a first frequency with which selection actions are performed by previous users with respect to the respective item, the selection actions being performed against previous query results generated in response to previous queries that include the respective query term; and present at least a portion of the first query result to the first user according to the ranking values.

13. The non-transitory computer-readable storage medium of claim 12, wherein the selection actions are performed by previous users corresponding to a first demographic group.

14. The non-transitory computer-readable storage medium of claim 12, wherein each rating score further depends at least in part on a type of selection action performed by a previous user.

15. The non-transitory computer-readable storage medium of claim 14, wherein the type of selection action includes at least one of (i) causing display of additional information about the respective item, (ii) following a hyperlink within the additional information, (iii) adding the respective item to a tentative shopping list, and (iv) purchasing the respective item.

16. The non-transitory computer-readable storage medium of claim 12, wherein the selection actions are performed by previous users during a first time frame, and each rating score further depends at least in part on a second frequency with which selection actions are performed by previous users during a second time frame, the second time frame being more recent than the first time frame, and wherein the second frequency is given more weight than the first frequency.

17. A system, comprising:

at least one device processor; and memory including instructions that, when executed by the at least one device processor, enable the system to:

receive a first query from a first user, the first query including one or more query terms;

generate a first query result including one or more items corresponding to the first query;

for each respective item in the first query result, determine a ranking value using one or more rating scores, each rating score corresponding to a respective query term and depending at least in part on a first frequency with which selection actions are performed by previous users with respect to the respective item, the selection actions being performed against previous query results generated in response to previous queries that include the respective query term; and present at least a portion of the first query result for display to the first user according to the ranking values.

18. The system of claim 17, wherein each rating score further depends at least in part on a type of selection action performed by a previous user.

19. The system of claim 17, wherein the type of selection action includes at least one of (i) causing display of additional information about the respective item, (ii) following a hyperlink within the additional information, (iii) adding the respective item to a tentative shopping list, and (iv) purchasing the respective item.

20. The system of claim 17, wherein each rating score further depends at least in part on a duration of time the previous user views the additional information.

\* \* \* \* \*